May 12, 1959  M. E. HAINE  2,886,727
ELECTRON OPTICAL APPARATUS
Filed Dec. 4, 1956  2 Sheets-Sheet 1

INVENTOR
MICHAEL EDWARD HAINE
BY
ATTORNEY

United States Patent Office 2,886,727
Patented May 12, 1959

2,886,727

ELECTRON OPTICAL APPARATUS

Michael Edward Haine, Sulhamstead, England, assignor to Metropolitan-Vickers Electrical Company Limited, London, England, a British company Application December 4, 1956, Serial No. 626,252

Claims priority, application Great Britain December 12, 1955

2 Claims. (Cl. 313—76)

This invention relates to electron optical apparatus and has an important application in electron microscopes.

In such apparatus it is frequently necessary to provide for a first adjustment whereby the direction of an electron beam may be aligned in two transverse directions so that it impinges on a particular local area in the transverse plane and also to provide for a second adjustment whereby after the first adjustment has been carried out the direction of the beam may be adjusted without altering the point of impact. The reasons for these adjustments are as follows:

In the electron microscope the illuminating beam is almost parallel. It falls on the specimen which is mounted just before the objective lens. In ordinary transmission working where the specimen is very thin and the beam passes straight through it, the thicker parts producing a small amount of scattering and thus producing contrast in an image, the illuminating beam must lie accurately parallel with the axis of the objective lens. If it does not, then the misalignment results in a movement of the image when small changes in the high voltage or lens currents occur and these cannot be reduced indefinitely. Thus there exists the requirement of aligning the electron beam accurately parallel to the objective lens axis. In addition to this it is clearly necessary that the beam which has quite a small diameter shall illuminate the region of the specimen around the point where it is cut by the objective lens axis. In other words, the beam must illuminate the required field of view. To achieve this it is necessary to produce an $x$ and $y$ lateral translation of the whole gun or at least of the electron beam. Thus there exists the second requirement of an $x$ and $y$ lateral translation of the beam to bring its axis in coincidence with the objective lens axis. It will be appreciated that the two foregoing alignments require adjustment in two directions each, the first one tilts, the second one displaces laterally.

In the optical microscope opaque objects may be looked at by light reflected from their surfaces. In the electron microscope this is only possible under very restricted circumstances because electrons are not regularly reflected from surfaces but are mainly absorbed or widely scattered. The exception to this is that if the electrons fall on the surface at a very small glancing angle, i.e. almost parallel to the surface, the scattering is small and the beam bounces, as it were, off the surface leaving it at a similarly small angle. In this case the scattered electrons can be focused in the electron microscope to produce an image and thus it is possible to look at a solid surface directly. To achieve this condition the specimen is mounted in the microscope with its surface tilted at a few degrees with respect to the axis of the objective lens. The illuminating electron beam must then be tilted at an angle to the specimen surface so as to fall on it at more or less glancing incidence (i.e. a few degrees). This means that the electron beam must be tilted at an angle greater than that between the object surface and the objective lens axis by this additional few degrees. Thus there exists the requirement that the electron beam should be tilted to an angle of up to, say, 20° with the objective lens axis. Under these conditions of operation it is still necessary to have the lateral adjustment of the electron beam to position the area which is illuminated around the point where the objective lens axis strikes the surface of the object.

Previously such adjustments have been carried out mechanically, for instance, by mounting the electron gun on a block which may be moved laterally to position the point of input of the beam on a target without varying its direction, i.e. so that it remains parallel to original direction, whilst in order then to vary the direction of the beam without changing the point of impact, the gun is movable over a part spherical surface on the block, the centre of curvature of which is substantially coincident with the point on the target at which the beam is to impinge. By a combination of the two adjustments the beam may be adjusted as desired.

It has also been proposed to adjust the beam either electrically or magnetically. Such arrangements, however, have the disadvantage that it has been necessary to employ four different deflecting means distributed along the path of the beam which makes an inconveniently long assembly of the apparatus.

The main object of the invention is to provide an improved arrangement which avoids the above difficulties.

According to the present invention electron optical apparatus comprises means for deflecting the beam of electrons in two directions substantially perpendicular to each other, in which said means comprise two pairs of combined electrostatic and magnetic deflecting means displaced along the length of said beam and so arranged that the first pair of said deflecting means deflects the beam electrostatically in a first lateral direction and magnetically in a second lateral direction which is substantially perpendicular to said first lateral direction, and the second pair deflects the beam in two directions which are respectively substantially opposite to those in which the beam had been deflected by said first pair of deflecting means, the arrangement being such that the direction in which said beam impinges on a target may be varied without appreciably altering its point of impact on said target.

According to a preferred arrangement said pairs of deflecting means each comprise a pair of electromagnets of variable strength disposed on opposite sides of said electron beam and having insulated pole pieces which are connected to points of variable potential such that they act as electrostatic deflecting plates, the electrostatic and electromagnetic fields produced thereby causing said beam to be deflected electrostatically between said plates and electromagnetically at right angles to said plates.

In order that the invention may be more clearly understood reference will now be made to the accompanying drawings in which.

Figure 1:
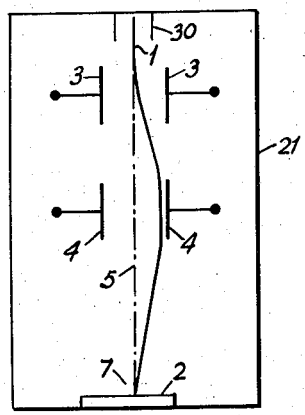
Fig. 1 illustrates graphically the manner in which the beam is deflected.

In Fig. 1 the reference 1 indicates the beam which is projected from a source 30 and 2 is the target. A first pair of deflector plates 3, 3' is arranged to deflect the beam to the right and a second pair 4, 4' is arranged to deflect the beam to the left. The dotted line 5 indicates the direction of the beam undeflected and it will be observed that the double deflection does not appreciably alter the point of impact 7. The apparatus is enclosed in an envelope 21 which is adapted to be evacuated.

Figure 2:
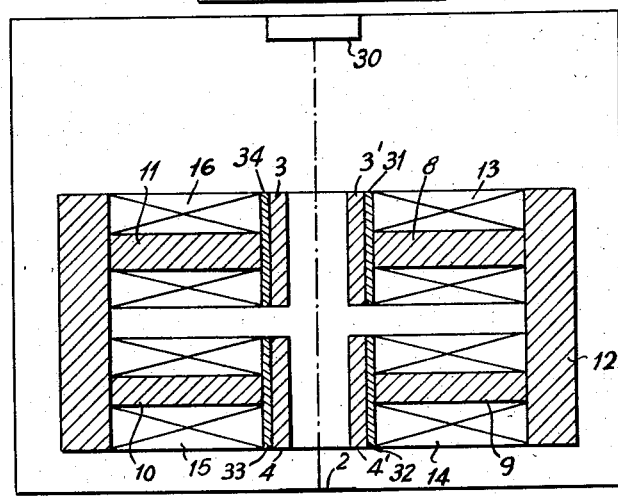
Fig. 2 is a longitudinal sectional view.
Figure 3:
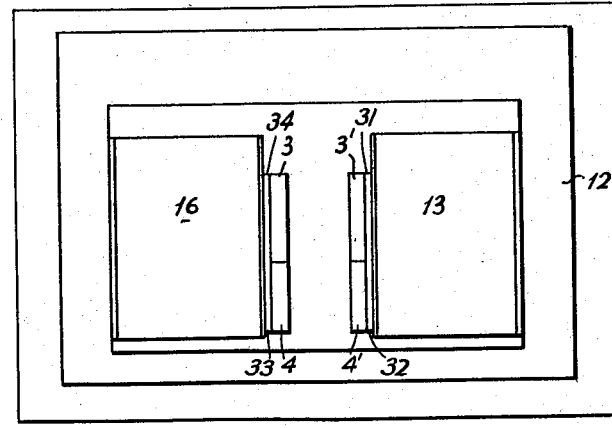
Fig. 3 is a plan view of the apparatus shown in Fig. 2.

Figs. 2 and 3 show a practical arrangement in which electrical poles 3, 3' and 4, 4' are arranged to operate on the beam as described in Fig. 1. In this case, however the pole pieces are mounted on the ends of magnetic cores 8, 9, 10 and 11 respectively, and insulated therefrom by elements 31, 32, 33, and 34, respectively, which cores in turn are carried on a surrounding yoke 12. The cores 8, 9, 10 and 11 carry windings 13, 14, 15 and 16 respectively. As shown in Fig. 2 the pole pieces 3, 3' and 4, 4' are electrically insulated from the magnetic cores on which they are carried.

It will be appreciated that with such an arrangement if potentials are applied to the pole pieces 3, 3' so as to deflect the beam to the right in the plane of the paper then the poles 4, 4' will deflect the beam to the left and similarly, the magnetic fields due to windings 13 and 16 will deflect the beam downwards into the paper or upwards, as the case may be, and the windings 14 and 15 will correspondingly deflect the beam upwards out of the paper or downwards into the paper, as the case may be. Such an arrangement, it will be appreciated, effects all the beam adjustments normally necessary and provides a compact construction which does not require an excessive length of apparatus.

Figure 4:
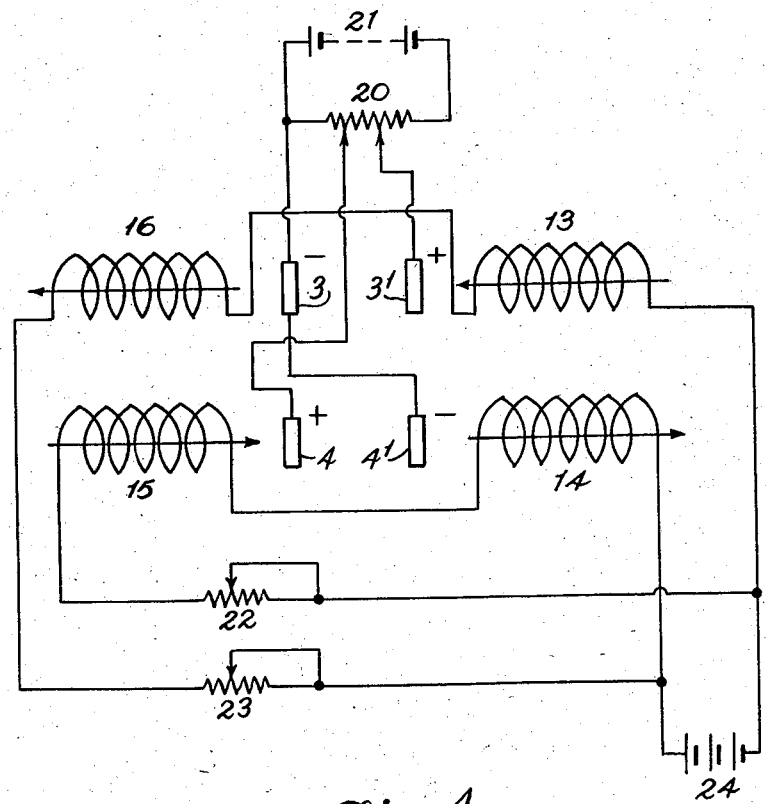
Fig. 4 shows the electrical circuit connections.

With reference to Fig. 4 which shows a diagram of a suitable electrical control circuit for the combined electromagnetic and electrostatic deflecting plates 3, 3', 4, 4' represent the two pairs of insulated pole pieces which are connected to a potentiometer 20 supplied from a suitable source of potential 21. This enables the electrostatic field produced between the pole pieces to be varied as required. 13, 14, 15 and 16 represent the two pairs of electromagnet coils which are connected via two variable resistances 22, 23 to a suitable source of potential 24. This enables the electromagnetic field produced by the coils to be varied as required.

What I claim is:

1. Electron optical apparatus for projecting a beam of electrons, a target for said beam, means for deflecting said beam in a first and a second lateral direction, said directions being substantially at right angles to one another, said deflecting means comprising two pairs of combined electrostatic and magnetic deflecting means displaced along the axis of the beam, the arrangement being such that the first pair of deflecting means deflects the beam electrostatically in the first lateral direction and magnetically in the second lateral direction and the second pair of deflecting means deflects the beam electrostatically in a third direction substantially opposite to the first direction and magnetically in a fourth direction substantially opposite to the second direction, and means for controlling the deflections so that the direction of incidence of said beam on said target may be varied without appreciably altering its point of impact.

2. Electron optical apparatus for projecting a beam of electrons, a target for said beam, means for deflecting said beam in a first and a second lateral direction, said directions being substantially at right angles to each other, said deflecting means comprising a pair of combined electrostatic and magnetic deflecting means displaced along the axis of the beam, each of which comprises a pair of electromagnets of variable strength having a common yoke and disposed on opposite sides of said electron beam and having insulated pole pieces adapted to be connected to sources of variable potential so as to form a pair of deflecting plates, the arrangement being such that the first pair of combined deflecting means deflects the beam electrostatically in the first lateral direction and magnetically in the second lateral direction, the second pair of combined deflecting means deflects the beam electrostatically in a third direction substantially opposite to said first lateral direction and magnetically in a fourth direction substantially opposite to said second lateral direction, and means for controlling the deflections so that the direction of incidence of said beam on said target may be varied without appreciably altering its point of impact.

References Cited in the file of this patent
UNITED STATES PATENTS

| | | |
|---|---|---|
| 2,077,272 | Schlesinger | Apr. 13, 1937 |
| 2,143,579 | Ruska | Jan. 10, 1939 |
| 2,212,640 | Hogan | Aug. 27, 1940 |